United States Patent
Nakano (10) Patent No.: US 10,195,906 B2
(45) Date of Patent: Feb. 5, 2019

(54) TIRE (71) Applicant: Sumitomo Rubber Industries, Ltd., Kobe-shi, Hyogo (JP)

(72) Inventor: Keita Nakano, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 36 days.

(21) Appl. No.: 15/066,161

(22) Filed: Mar. 10, 2016

(65) Prior Publication Data
US 2016/0288581 A1  Oct. 6, 2016

(30) Foreign Application Priority Data

Apr. 3, 2015  (JP) ................. 2015-076772

(51) Int. Cl.
*B60C 11/03*  (2006.01)
*B60C 11/11*  (2006.01)

(52) U.S. Cl.
CPC ...... *B60C 11/0327* (2013.01); *B60C 11/0302* (2013.01); *B60C 11/0304* (2013.01); *B60C 11/0306* (2013.01); *B60C 11/11* (2013.01); *B60C 2011/0313* (2013.01); *B60C 2011/0334* (2013.01); *B60C 2011/0358* (2013.01); *B60C 2011/0374* (2013.01)

(58) Field of Classification Search
CPC ............... B60C 11/0327; B60C 19/001; B60C 2011/0339; B60C 11/0302; B60C 11/0304; B60C 11/0306; B60C 11/11
USPC .................................. 152/209.1
See application file for complete search history.

(56) References Cited

U.S. PATENT DOCUMENTS

| 6,190,478 B1* | 2/2001 | Watkins | B60C 19/001 |
| | | | 152/209.17 |
| 2011/0094640 A1* | 4/2011 | Nakano | B60C 11/0304 |
| | | | 152/209.18 |
| 2011/0094642 A1* | 4/2011 | Nakano | B60C 19/001 |
| | | | 152/209.23 |

FOREIGN PATENT DOCUMENTS

| EP | 2853416 A1 * | 4/2015 | ............ B60C 11/04 |
| JP | 11-198608 A | 7/1999 | |
| JP | 2002-316516 A | 10/2002 | |
| JP | 2008037260 A * | 2/2008 | |

(Continued)

OTHER PUBLICATIONS

Extended European Search Report dated Sep. 30, 2016, in European Patent Application No. 16160074.7.

*Primary Examiner* — Jacob T Minskey
*Assistant Examiner* — Cedrick S Williams
(74) *Attorney, Agent, or Firm* — Birch, Stewart, Kolasch & Birch, LLP (57) ABSTRACT

A tire includes a tread portion having an installing direction to a vehicle so as to have an outboard tread edge. The tread portion is provided with a plurality of first inclined grooves each having an inclination to a circumferential direction of the tire and extending from at least a tire equator to the outboard tread edge, a plurality of second inclined grooves each having an opposite inclination to the inclination of the first inclined grooves and extending from at least the tire equator toward the outboard tread edge, and a plurality of blocks separated by the first inclined grooves and the second inclined grooves. Each second inclined groove includes an outboard end that terminates at one of the first inclined grooves so that a plurality of substantially trapezoidal shoulder blocks are arranged along the outboard tread edge.

14 Claims, 5 Drawing Sheets

(56) References Cited

FOREIGN PATENT DOCUMENTS

| JP | 2008037260 A | * | 2/2008 |
| JP | 2008037263 A | * | 2/2008 |
| JP | 2011-93391 A | | 5/2011 |

* cited by examiner

PRIOR ART

FIG.5 Comparative Example

TIRE

BACKGROUND ART

Field of the Invention

The present invention relates to tires, and in particular relates to a tire for running on soft terrain capable of improving traction while ensuring wear resistance.

Description of the Related Art

Conventionally, tires for rally and the like are required powerful traction to grip better on a soft rough terrain such as gravel and mud. In order to increase traction on the soft rough terrain, a tire including a tread portion provided with inclined grooves with a large volume has been proposed by Japanese Unexamined Patent Application Publication No. 2011-93391.

Unfortunately, the inclined grooves may lower rigidity of the tread portion, and low wear resistance of the tread portion would also be brought.

SUMMARY OF THE INVENTION

In view of the above problems in the conventional art, the present invention has an object to provide a tire capable of improving traction on soft rough terrain while ensuring wear resistance.

According to the present invention, a tire includes a tread portion having an installing direction to a vehicle. The tread portion has an outboard tread edge and an inboard tread edge. The tread portion is provided with a plurality of first inclined grooves each having an inclination with respect to a circumferential direction of the tire and extending from at least a tire equator to the outboard tread edge, a plurality of second inclined grooves each having an opposite inclination to the inclination of the first inclined grooves and extending from at least the tire equator toward the outboard tread edge, and a plurality of blocks separated by the first inclined grooves and the second inclined grooves. Each second inclined groove includes an outboard end that terminates at one of the first inclined grooves so that a plurality of substantially trapezoidal shoulder blocks are arranged along the outboard tread edge.

In another aspect of the invention, the tread portion may have a designated rotational direction, and the second inclined grooves may be inclined forward in the rotational direction from the tire equator toward the outboard tread edge.

In another aspect of the invention, each of the second inclined grooves may extend in an arc shape that protrudes backwardly in the rotational direction.

In another aspect of the invention, each of the first inclined grooves may be inclined at an angle of from 30 to 45 degrees with respect to the circumferential direction of the tire.

In another aspect of the invention, the tread portion, in order toward the inboard tread edge, may further include a first blocks, a second block and a third block, and the first block, the second block and the third block may satisfy the following relation:

$$S1 < S2 < S3,$$

where S1, S2 and S3 are top surface areas of the first block, the second block and the third block, respectively.

In another aspect of the invention, in a development view of the tread portion, each of the second inclined grooves may be curved in an arc shape having a radius of curvature, and the center of the curvature may be located on the side of the inboard tread edge with respect to the tire equator.

In another aspect of the invention, each of the second inclined grooves may extend continuously and smoothly between the outboard end and an inboard end.

DESCRIPTION OF THE PREFERRED EMBODIMENTS

An embodiment of the present invention will be explained below with reference to the accompanying drawings.

Figure 1:
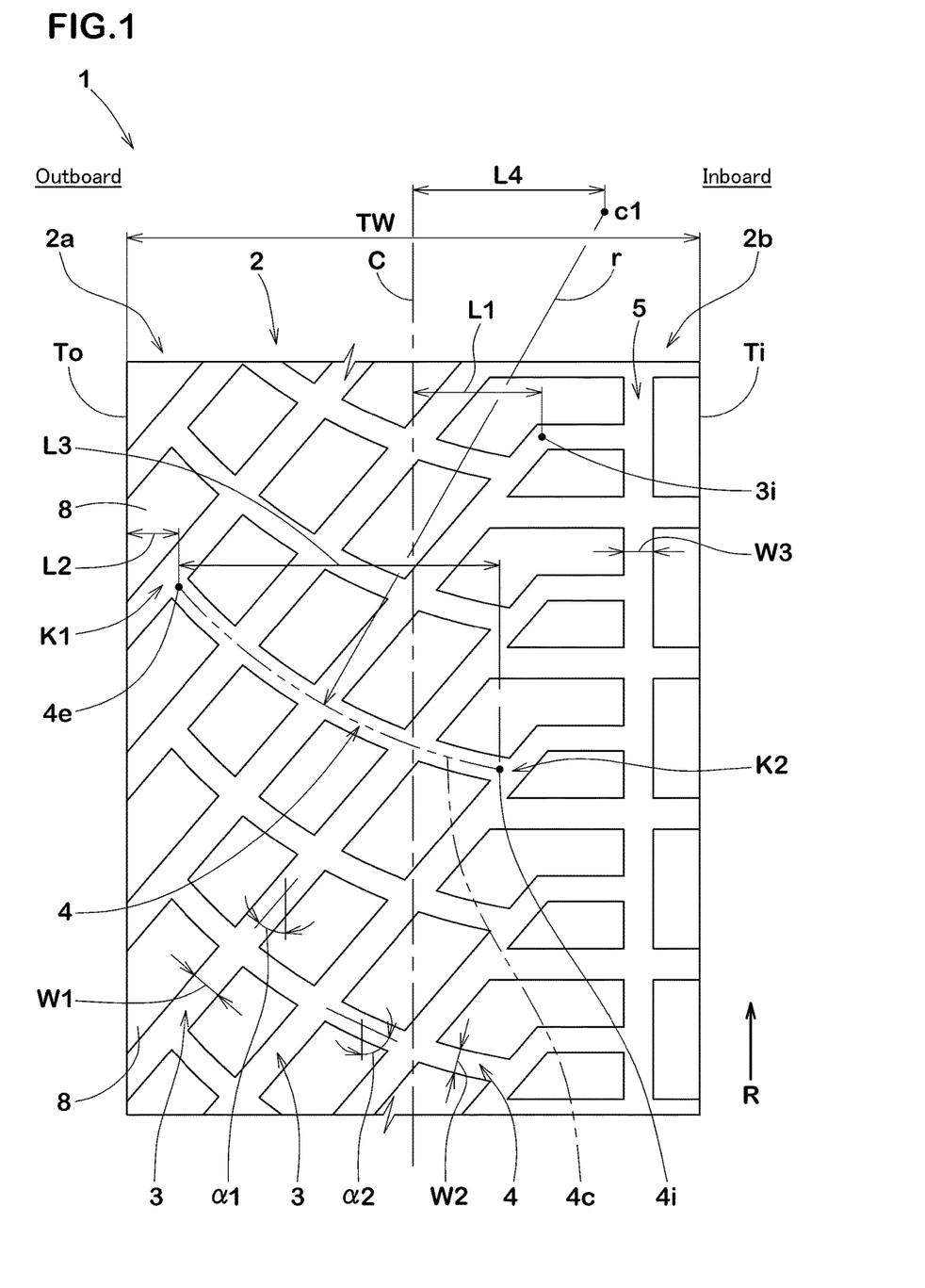
FIGS. 1 and 2 are development views of a tread portion in accordance with an embodiment of the present invention.

FIG. 1 illustrates a development view of a tread portion 2 of a tire 1 in accordance with an embodiment of the present invention. The tire 1, for example, is embodied as not only a pneumatic tire for passenger cars or heavy duty vehicles, but also a non-pneumatic tire that supports a tire load by its structural members without filling up an air pressure. In this embodiment, the tire 1 is exemplified as a pneumatic tire for rally that travels on soft rough terrain such as gravel and mud.

As illustrated in FIG. 1, the tread portion 2 includes an asymmetrical tread pattern having an installing direction to a vehicle. The tread portion 2 includes an outboard tread edge To and an inboard tread edge Ti. The outboard tread edge To refers to one of the tread edges which is intended to be positioned away from the center of a vehicle body. The inboard tread edge Ti refers to the other tread edge which is intended to be positioned towards the center of the vehicle body. Furthermore, the tread portion 2 has a designated rotational direction R to maximize advantageous effects of the tread pattern. The installing direction and the rotational direction R may be indicated on a sidewall portion (not shown) using a mark or characters.

The tread portion 2 includes an outboard tread portion 2a located between the tire equator C and the outboard tread edge To, and an inboard tread portion 2b located between the tire equator C and the inboard tread edge Ti.

As used herein, the tread edges To and Ti refer to axially outermost edges of the ground contacting patch of the tread portion 2 which occurs under a normally inflated loaded condition when the camber angle of the tire 1 is zero. The normally inflated loaded condition is such that the tire 1 is mounted on a standard wheel rim and inflated to a standard pressure and loaded with a standard tire load.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example. In case of passenger car tires, however, the standard pressure is uniformly defined by 180 kPa.

In case of race tires having no standards officially approved, the standard wheel rim and the standard pressure may be defined as a wheel or inner pressure recommended by the tire supplier.

The standard load is a tire load officially approved or recommended for the tire by standards organizations, wherein the standard load is the "maximum load capacity" in JATMA, the "Load Capacity" in ETRTO, and the maximum value given in the above-mentioned table in TRA or the like. In case of passenger car tires, however, the standard tire load is uniformly defined by 88% of the maximum tire load.

As used herein, various dimensions, positions and the like of the tire refer to those under a normally inflated unloaded condition of the tire unless otherwise noted. The normally inflated unloaded condition is such that the tire 1 is mounted on the standard wheel rim and inflated to the standard pressure but loaded with no tire load. Here, the tread width TW is the width measured under the normally inflated unloaded condition, as the axial distance between the tread edges To and Ti.

As illustrated in FIG. 1, the tread portion 2 is provided with a plurality of first inclined grooves 3 each having an inclination with respect to the circumferential direction of the tire, a plurality of second inclined grooves 4 each having an opposite inclination to the inclination of the first inclined grooves 3 and a circumferentially and continuously extending main groove 5.

The first inclined grooves 3 extend from at least the tire equator C to the outboard tread edge To continuously. The first inclined grooves 3 may offer a long axial component so as to generate a large mud-shearing force, for example, in order to increase traction on soft terrain.

Each of the first inclined grooves 3 includes an inboard end 3i that terminates within the inboard tread portion 2b. That is, the first inclined grooves 3 according to the present embodiment are not communicated with the inboard tread edge Ti. Thus, the rigidity of the tread portion 2 around the inboard ends 3i of the first inclined grooves 3 may be maintained high. Accordingly, since large deformation of the groove edges of the first inclined grooves 3 is suppressed when coming into contact with the road, the wear resistance of the tread portion 2 can be improved.

In this embodiment, the first inclined groove 3 extends in a straight manner. This configuration can move mud introduced in the first inclined groove 3 easily to improve traction. Alternatively, the first inclined groove 3 may be formed as a curve or zigzag manner.

The first inclined grooves 3 extend backwardly in the rotational direction R from the side of the tire equator C to the outboard tread edge To. The first inclined grooves 3 can push soil or mud out from the outboard tread edge To smoothly using lateral force and ground contact pressure during traveling to improve traction.

Preferably, the first inclined grooves 3 have an angle $\alpha 1$ in a range of from 30 to 45 degrees, more preferably in a range of from 35 to 40 degrees with respect to the circumferential direction of the tire. The first inclined grooves 3 having the above-mentioned angle may improve mud shearing force and a self-cleaning feature for removing mud therefrom using the tire rotation in well balanced manner.

Preferably, the axial distance L1 between each inboard end 3i and the tire equator C is in a range of from 5% to 15% of the tread width TW. With this, the first inclined grooves 3 may maintain a large groove volume to improve mud-shearing force. Furthermore, the rigidity of the tread portion 2 around the inboard ends 3i of the first inclined grooves 3 may be enhanced, thereby improving the wear resistance of the tread portion 2. As used herein, an end of a groove is defined using its groove centerline.

Preferably, the first inclined grooves 3 have a width W1 in a range of from 3.5% to 7.5% of the tread width TW in order to further improve advantageous effects described above.

The second inclined grooves 4 are inclined in an opposite direction to the first inclined groove 3 and extend smoothly and continuously from at least the tire equator C toward the outboard tread edge To. That is, the second inclined grooves 4 extend forward in the rotational direction R from at least the tire equator C toward the outboard tread edge To. With this, since either one of the first inclined grooves 3 or the second inclined grooves 4 may generate a large mud-shearing force in any cornering directions, traction on cornering can be improved. Furthermore, straight traveling stability of the tire can also be improved by being canceled the lateral force in mutually reverse directions generated by the first inclined grooves 3 and the second inclined grooves 4.

Each of the second inclined grooves 4 includes an axially outboard end 4e located on the side of the outboard tread edge To, and the outboard end 4e terminates by reaching one of the first inclined grooves 3 without reaching the outboard tread edge To. In this embodiment, each outboard end 4e of each second inclined groove 4 terminates so that a T-shaped groove junction K1 between one of the second inclined grooves 4 and one of the first inclined grooves 3 is formed. Thus, in the outboard tread portion 2a, a plurality of substantially trapezoidal shoulder blocks 8 are separated, and each shoulder block 8 is surrounded by circumferentially adjacent first inclined grooves 3 and one of the second inclined grooves 4 that terminates at one of the concerned first inclined grooves 3. Such an outboard tread portion 2a may ensure the rigidity of a portion around the outboard tread edge To where a plurality of substantially trapezoidal shoulder blocks 8 are arranged, thereby improving the wear resistance of the tire.

Preferably, each axial distance L2 between each outer end 4e of each second inclined groove 4 and the outboard tread edge To is in a range of from 6% to 12% of the tread width TW in order to further improve traction as well as the wear resistance of the tire.

Each of the second inclined grooves 4 includes an inboard end 4i on the side of the inboard tread edge Ti, and the inboard end 4i terminates by reaching one of the first inclined grooves 3 without reaching the inboard tread edge Ti. Accordingly, each inner end 4i of each second inclined groove 4 terminates so as to form a T-shaped groove junction K2 between one of the second inclined grooves 4 and one of the first inclined grooves 3. Thus, the rigidity of a portion around each inner end 4i of the second inclined grooves 4 may be enhanced to improve the wear resistance of the tire. In this embodiment, the second inclined grooves 4 extend continuously in a smooth arc shape from each outer end 4e to each inboard end 4i.

In this embodiment, each of the second inclined grooves 4 extends in the arc shape that protrudes backwardly in the rotational direction R. Such a second inclined groove 4 may offer not only large groove volume and length but also powerful traction obtained by scooping mud out from soft terrain during traveling as compared with a straight groove shape.

Preferably, the center c1 of the curvature r of each second inclined groove 4 is located on the side of the inboard tread edge Ti with respect to the tire equator C in order to offer powerful traction during straight traveling. More preferably, the center c1 of the curvature r is located on the inboard tread portion 2b. In order to further improve the advantageous effects, an axial distance L4 between the center c1 of the curvature and the tire equator C is in a range of from 10% to 45% the tread width TW.

Preferably, an axial length L3 of each second inclined groove 4, which is an axial distance between the inboard end 4i and the outboard end 4e on the groove centerline 4c, is in a range of from 50% to 65% of the tread width TW in order to further improve traction while ensuring the wear resistance.

Preferably, the second inclined grooves 4 have a width W2 in a range of from 2.5% to 6.5% of the tread width TW in order to offer a sufficient mud-shearing force while ensuring the wear resistance.

The main groove 5, for example, is disposed proximate to the side of the inboard tread edge Ti. In this embodiment, the main groove 5 is disposed axially outward of the first inclined grooves 3 and the second inclined grooves 4. The main groove 5, for example, extends in a straight shape in the circumferential direction of the tire to enhance the circumferential rigidity of land portions which are on both sides of the main groove 5. Alternatively, the main groove 5 may extend in a zigzag or arc shape. Preferably, the main groove 5 has a width W3 in a range of from 3% to 7% of the tread width TW.

Figure 2:
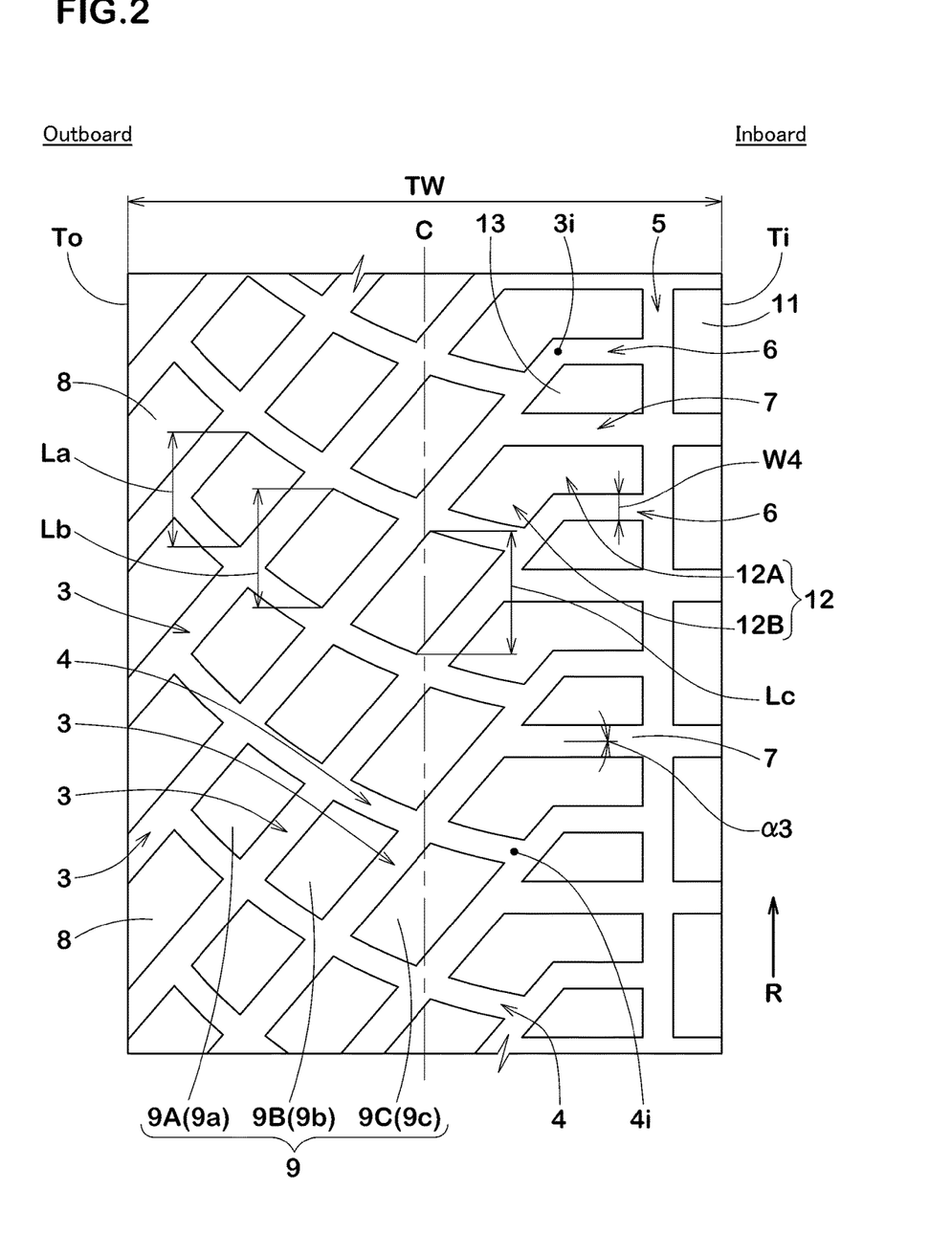

As illustrated in FIG. 2, the tread portion 2 is further provided with a plurality of first lateral grooves 6 and a plurality of second lateral grooves 7 which are arranged alternately on the circumferential direction of the tire.

The first lateral grooves 6 each extend to connect the inner end 3i of one of the first inclined grooves 3 with the main groove 5. The second lateral grooves 7 each extend to connect the inboard tread edge Ti with a portion of one of the first inclined grooves 3 located axially inward of the inboard end 3i. These first and second lateral grooves 6 and 7 may discharge mud introduced therein effectively from the inboard tread edge Ti through the main groove 5.

The first lateral grooves 6 and the second lateral grooves 7 extend in a straight shape along the axial direction of the tire. Since the first lateral grooves 6 and the second lateral grooves 7 may have a long axial component, these grooves can generate powerful traction on soft rough terrain such as mud. In the same point of view, angles α3 of the respective first lateral groove 6 and second lateral groove 7 are preferably in a range of not more than 10 degrees, more preferably in a range of not more than 5 degrees with respect to the axial direction of the tire.

Preferably, widths W4 of the respective first lateral grooves 6 and second lateral grooves 7 are in a range of from 3% to 7% of the tread width TW, for example.

The tread portion 2 further includes a plurality of substantially rectangular middle blocks 9 arranged inboard side of the shoulder blocks 8. Each middle block 9 is divided by circumferentially adjacent first inclined grooves 3 and circumferentially adjacent second inclined grooves 4. The middle blocks 9, in order toward the inboard tread edge Ti, include a first block 9A, a second block 9B and a third block 9C, in each location between a pair of circumferentially adjacent second inclined grooves 4. In this embodiment, each third block 9C is arranged on the tire equator C.

In this embodiment, the first block 9A, the second block 9B and the third block 9C satisfy the following relation (1):

$$S1<S2<S3 \quad (1),$$

where S1, S2 and S3 are top surface areas 9a, 9b and 9c of the first block 9A, the second block 9B and the third block 9C, respectively.

As described above, a top surface area of a middle block 9 located on the side of the tire equator C is preferably larger than that of the middle block 9 which is located on the side of the outboard tread edge To of the concerned middle block 9. Thus, the rigidity of the middle blocks 9 may be enhanced in order toward the tire equator C on which a large ground contact pressure acts, thereby improving the wear resistance of the middle blocks 9 by uniformizing these wear amount. Preferably, ratios S2/S1 and S3/S2 of the top surface areas 9a, 9b and 9c are in a range of from 1.1 to 1.4 in order to further uniformize the amount of wear of the respective middle blocks 9A, 9B and 9C in well balanced manner.

The second inclined grooves 4 having a long axial length L3 may increase traction. Furthermore, since the first block 9A, the second block 9B and the third block 9C satisfy the above-mentioned relation (1), preferred rigidity balance of these blocks 9A to 9C can be obtained while ensuring groove volume. Accordingly, the tire 1 in accordance with the present embodiment can offer powerful traction on soft terrain as well as an excellent wear resistance.

In addition, the middle blocks 9 preferably satisfy the following relation (2):

$$La<Lb<Lc \quad (2),$$

where La, Lb and Lc are circumferential maximal lengths of the first block 9A, the second block 9B and the third block 9c, respectively.

By satisfying the relation (2), a circumferential length of a middle block 9 located on the side of the tire equator C is set larger than that of the middle block 9 which is located on the side of the outboard tread edge To of the concerned middle block 9. Thus, the rigidity of the middle blocks 9 may also be enhanced in order toward the tire equator C, thereby improving the wear resistance of the middle blocks 9 by uniformizing these wear amount while ensuring a sufficient groove volume for traction. In order to further improve the advantageous effects, the ratios Lb/La and Lc/Lb of lengths of the middle blocks 9A to 9C are preferably in a range of more than 1.0 and not more than 1.15. More preferably, the maximal length Ls of the third block 9C is in a range of from 15% to 25% the tread width TW.

The tread portion 2 further includes a plurality of inboard shoulder blocks 11, a plurality of first inboard middle blocks 12 and a plurality of second inboard middle blocks 13.

The inboard shoulder blocks 11 each are defined by the main groove 5, the inboard tread edge Ti and adjacent second lateral grooves 7. In this embodiment, the inboard shoulder blocks 11 are configured as a circumferential long rectangular shape.

The first inboard middle blocks 12 each are defined by circumferentially adjacent first inclined grooves 3, one of the second inclined grooves 4, one of the first lateral grooves 6, one of the second lateral grooves 7 and the main groove 5. In this embodiment, the first inboard middle blocks 12 are configured as a bent shape that includes an axially extending portion 12A and an inclined portion 12B arranged axially inward of the axially extending portion 12A.

The second inboard middle blocks 13, for example, each are configured as a trapezoidal shape which is defined by one of the first inclined groove 3, one of the first lateral grooves 6, one of the second lateral grooves 7 and the main groove 5.

While the embodiments in accordance with the present invention have been described in detail, the present invention is not limited to the illustrated embodiments, but can be modified and carried out in various aspects.

EXAMPLE

Test tires having a size 205/60R15 and a basic tread pattern illustrated in FIG. 1 were manufactured based on details shown in Table 1. Then, wear resistance, traction, straight traveling stability and cornering performance of each test tire were tested. The common specifications of tires and test procedures are as follows.

Groove depths of first inclined grooves, second inclined grooves and main groove: 11.5 mm Groove depth of first and second lateral grooves: 11.5 mm Angles of first inclined groove α1: 40 deg.

Traction, Cornering and Straight Traveling Performance Test:

Each test tire was installed to a four-wheel drive vehicle having a displacement of 2,000 cc using a rim of 7Jx15 with an inner pressure of 210 kPa. Then, a test driver drove the vehicle on a dirt trial test course for 20 laps to evaluate traction, cornering performance and straight traveling performance of each test tire by his feeling. The results are indicated using a score of Ex. 1 being 100. The larger the value, the better the performance is. Note that a 10-point difference means a significant performance difference, and a 5-point difference means an obvious performance difference.

Wear Resistance Test:

The test vehicle was traveled on a dry asphalt test course for 10,000 km. After traveling, groove depths remaining of the first and second inclined grooves on the rear wheel were measured at eight positions in the circumferential direction of the tire. Then difference between the groove depth before traveling and the average remaining groove depth was calculated as a groove wear amount. The smaller the value, the better the performance is.

The test results are shown in Table 1. From the test results, it has been confirmed that the example tires improved the respective performances in well balanced manner as compared with the reference tires. In another test using tires having different size, the same results have been confirmed.

TABLE 1

Figure 3:
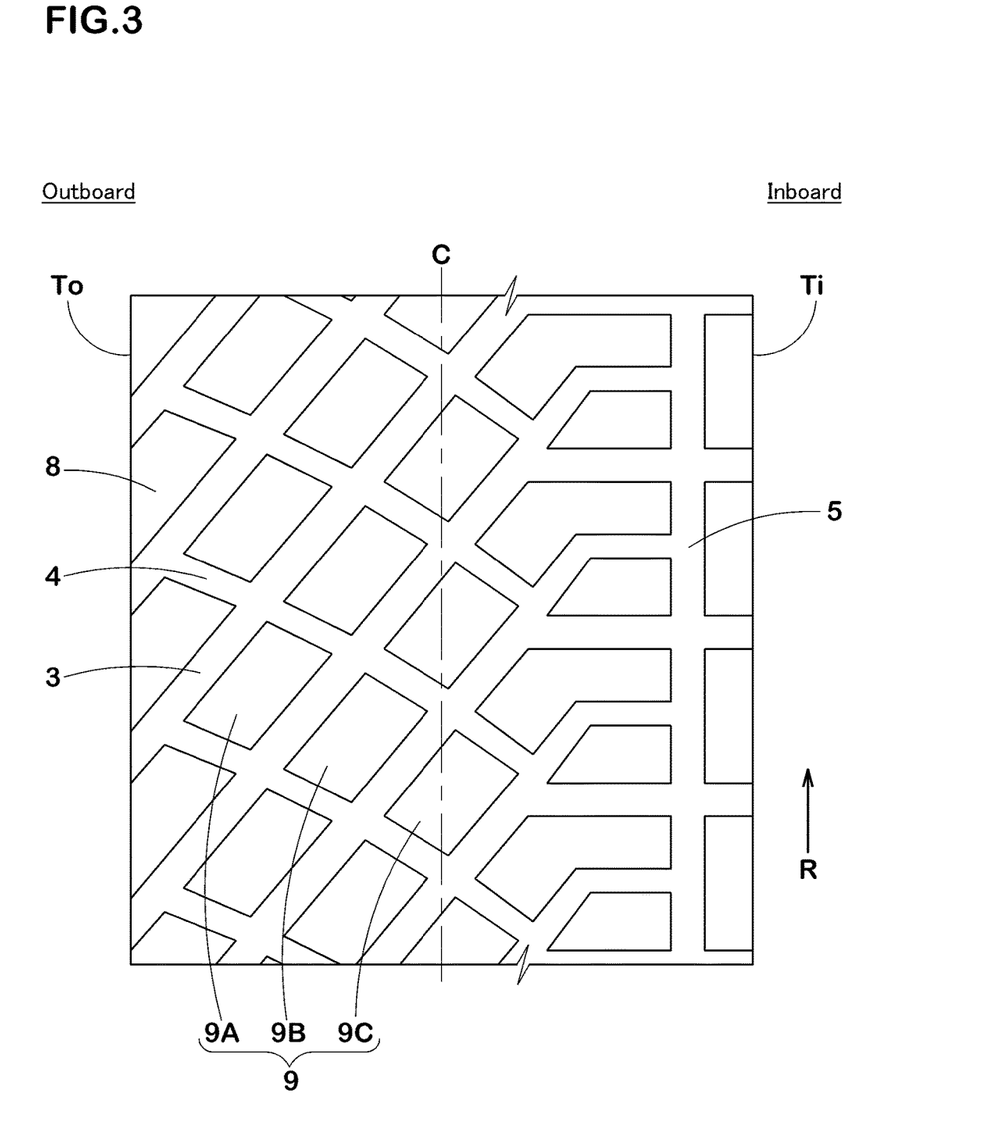
FIG. 3 is a development view of the tread portion in accordance with another embodiment of the present invention.
Figure 4:
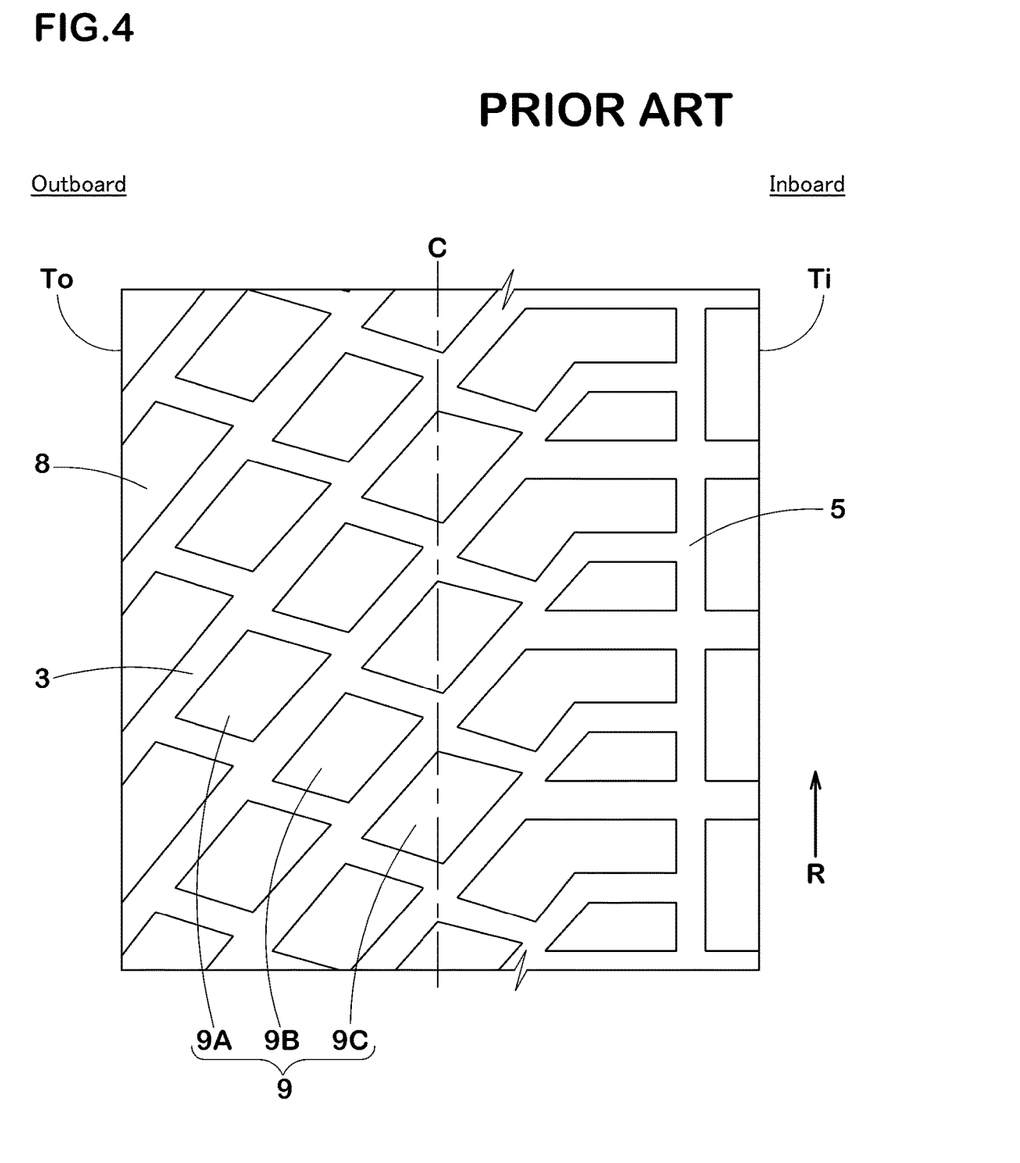
FIG. 4 is a development view of the tread portion in accordance with a conventional tire.
Figure 5:
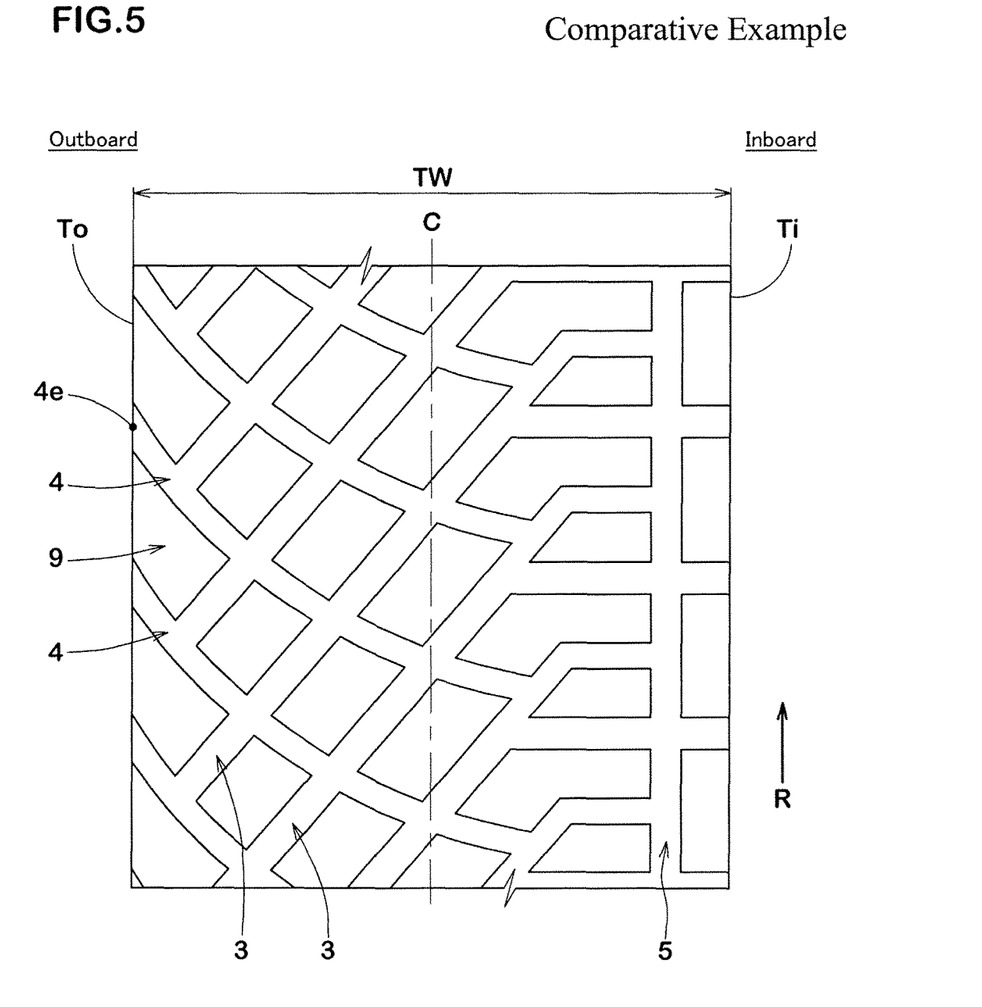
FIG. 5 is a development view of the tread portion in accordance with a comparative example tire.

|  | Ref. 1 | Ref. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Tread pattern | FIG. 4 | FIG. 5 | FIG. 1 | FIG. 3 | FIG. 1 | FIG. 1 | FIG. 1 | FIG. 1 | FIG. 1 | FIG. 1 |
| Ratio S2/S1 | 1.0 | 1.2 | 1.2 | 0.9 | 1.1 | 1.4 | 1.6 | 1.2 | 1.2 | 1.2 |
| Ratio S3/S2 | 1.0 | 1.2 | 1.2 | 0.9 | 1.1 | 1.4 | 1.6 | 1.2 | 1.2 | 1.2 |
| Ratio L2/TW (%) | 9 | 0 | 9 | 9 | 9 | 9 | 9 | 3 | 6 | 12 |
| Ratio L3/TW (%) | 13 | 65 | 55 | 55 | 55 | 55 | 55 | 55 | 55 | 55 |
| Ratio L4/TW (%) | −35 | 35 | 35 | −35 | 35 | 35 | 35 | 35 | 35 | 35 |
| Traction [Score] | 95 | 97 | 100 | 97 | 100 | 100 | 98 | 98 | 100 | 100 |
| Cornering performance [Score] | 93 | 95 | 100 | 97 | 99 | 99 | 98 | 97 | 98 | 100 |
| Straight traveling performance [Score] | 93 | 95 | 100 | 97 | 99 | 99 | 98 | 98 | 100 | 98 |
| Wear resistance [mm] | 2.4 | 3.5 | 2.0 | 2.4 | 2.0 | 2.0 | 2.2 | 2.5 | 2.2 | 2.0 |

|  | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|
| Tread pattern | FIG. 1 | FIG. 1 | FIG. 1 | FIG. 1 | FIG. 1 | FIG. 1 | FIG. 1 | FIG. 1 | FIG. 1 |
| Ratio S2/S1 | 1.2 | 1.2 | 1.2 | 1.2 | 1.2 | 1.2 | 1.2 | 1.2 | 1.2 |
| Ratio S3/S2 | 1.2 | 1.2 | 1.2 | 1.2 | 1.2 | 1.2 | 1.2 | 1.2 | 1.2 |
| Ratio L2/TW (%) | 18 | 9 | 9 | 9 | 9 | 9 | 9 | 9 | 9 |
| Ratio L3/TW (%) | 55 | 45 | 50 | 65 | 70 | 55 | 55 | 55 | 55 |
| Ratio L4/TW (%) | 35 | 35 | 35 | 35 | 35 | 3 | 10 | 45 | 65 |
| Traction [Score] | 97 | 98 | 100 | 100 | 98 | 97 | 100 | 100 | 98 |
| Cornering performance [Score] | 98 | 97 | 98 | 100 | 100 | 97 | 100 | 100 | 98 |
| Straight traveling performance [Score] | 97 | 98 | 100 | 98 | 98 | 98 | 100 | 100 | 97 |
| Wear resistance [mm] | 2.0 | 2.0 | 2.0 | 2.0 | 2.1 | 2.1 | 2.0 | 2.0 | 2.1 |

What is claimed is:

1. A tire comprising:
   a tread portion having an installing direction to a vehicle and a designated rotational direction, the tread portion having an outboard tread edge and an inboard tread edge;
   the tread portion being provided with a plurality of first inclined grooves each having an inclination with respect to a circumferential direction of the tire and extending from at least a tire equator to the outboard tread edge, a plurality of second inclined grooves each having an opposite inclination to the inclination of the first inclined grooves and extending from at least the tire equator toward the outboard tread edge, and a plurality of blocks separated by the first inclined grooves and the second inclined grooves; and
   each second inclined groove comprising an outboard end that terminates at one of the first inclined grooves so that a plurality of substantially trapezoidal shoulder blocks are arranged along the outboard tread edge,
   wherein the second inclined grooves are inclined forward in the rotational direction from the tire equator toward the outboard tread edge,
   wherein each of the second inclined grooves extends in an arc shape that protrudes backwardly in the rotational direction, and
   wherein an axial distance between a center of the arc shape and a tire equator is in a range from 10% to 45% of a tread width.

2. The tire according to claim 1,
wherein each of the first inclined grooves is inclined at an angle of from 30 to 45 degrees with respect to the circumferential direction of the tire.

3. The tire according to claim 1,
wherein the tread portion, in order toward the inboard tread edge, further comprises a first block, a second block and a third block, and the first block, the second block and the third block satisfy the following relation:

$$S1 < S2 < S3,$$

where S1, S2 and S3 are top surface areas of the first block, the second block and the third block, respectively.

4. The tire according to claim 1,
wherein in a development view of the tread portion, each of the second inclined grooves is curved in an arc shape having a radius of curvature, and the center of the curvature is located on the side of the inboard tread edge with respect to the tire equator.

5. The tire according to claim 1,
wherein each of the second inclined grooves extends continuously and smoothly between the outboard end and an inboard end.

6. The tire according to claim 1,
wherein each second inclined groove has an inboard end located on the side of the inboard tread edge with respect to the tire equator and the outboard end located on the side of the outboard tread edge with respect to the tire equator.

7. The tire according to claim 6,
wherein each second inclined groove has an axial length (L3), which is an axial distance between the inboard end and the outboard end on a groove centerline, in a range of from 50% to 65% of a tread width.

8. The tire according to claim 7,
wherein each second inclined groove extends continuously in an arc shape from the outboard end to the inboard end.

9. The tire according to claim 7,
wherein each second inclined groove extends continuously in a single arc shape from the outboard end to the inboard end.

10. The tire according to claim 3,
wherein ratios S2/S1 and S3/S2 of the top surface areas are in a range of from 1.1 to 1.4.

11. A tire comprising:
a tread portion having an installing direction to a vehicle and a designated rotational direction, the tread portion having an outboard tread edge and an inboard tread edge;
the tread portion being provided with a plurality of first inclined grooves each having an inclination with respect to a circumferential direction of the tire and extending from at least a tire equator to the outboard tread edge, a plurality of second inclined grooves each having an opposite inclination to the inclination of the first inclined grooves and extending from at least the tire equator toward the outboard tread edge, and a plurality of blocks separated by the first inclined grooves and the second inclined grooves; and
each second inclined groove comprising an outboard end and an inboard end, the outboard end terminating at, and forming a T-shaped groove junction with, one of the first inclined grooves on the outboard tread edge side of the tire equator so that a plurality of substantially trapezoidal shoulder blocks are arranged along the outboard tread edge, the inboard end terminating at, and forming a T-shaped junction with, another of the first inclined grooves on the inboard tread edge side of the tire equator,
wherein the second inclined grooves are inclined forward in the rotational direction from the tire equator toward the outboard tread edge,
wherein each of the second inclined grooves extends in an arc shape that protrudes backwardly in the rotational direction, and
wherein an axial distance between a center of the arc shape and a tire equator is in a range from 10% to 45% of a tread width.

12. The tire according to claim 11,
wherein each second inclined groove crosses through a plurality of the first inclined grooves between the outboard end and the inboard end.

13. A tire comprising:
a tread portion having an installing direction to a vehicle and a designated rotational direction, the tread portion having an outboard tread edge and an inboard tread edge;
the tread portion being provided with a plurality of first inclined grooves each having an inclination with respect to a circumferential direction of the tire and extending from at least a tire equator to the outboard tread edge, a plurality of second inclined grooves each having an opposite inclination to the inclination of the first inclined grooves and extending from at least the tire equator toward the outboard tread edge, and a plurality of blocks separated by the first inclined grooves and the second inclined grooves; and
each second inclined groove comprising an outboard end that terminates at one of the first inclined grooves so that a plurality of substantially trapezoidal shoulder blocks are arranged along the outboard tread edge,
wherein the second inclined grooves are inclined forward in the rotational direction from the tire equator toward the outboard tread edge, and wherein each of the second inclined grooves extends in an arc shape that protrudes backwardly in the rotational direction, the arc shape being a curved arc shape having a concave side that faces forward in the rotational direction, and
wherein an axial distance between a center of the arc shape and a tire equator is in a range from 10% to 45% of a tread width.

14. The tire according to claim 13,
wherein the curved arc shape has a radius of curvature, a center of the curvature being located on the inboard tread edge side of the tire equator and forward of the arc shape in the rotation direction.

* * * * *